United States Patent

[11] 3,548,945

| [72] | Inventor | John L. Gidley |
| | | Houston, Tex. |
| [21] | Appl. No. | 829,773 |
| [22] | Filed | June 2, 1969 |
| [45] | Patented | Dec. 22, 1970 |
| [73] | Assignee | Esso Production Research Company |
| | | a corporation of Delaware |
| | | Continuation-in-part of application Ser. No. 796,168, Feb. 3, 1969, now Patent No. 3,481,404. |

[54] METHOD FOR ACIDIZING SILICEOUS FORMATIONS
21 Claims, No Drawings

[52] U.S. Cl. .................................................. 166/307
[51] Int. Cl. ............................................. E21b 43/27
[50] Field of Search .......................................... 166/305, 307, 271, 282

[56] References Cited
UNITED STATES PATENTS

| 2,124,530 | 7/1938 | Loomis et al. ............... | 166/307 |
| 2,367,350 | 1/1945 | Heigl .......................... | 166/307 |
| 2,782,859 | 2/1957 | Garst ........................... | 166/307X |
| 2,885,004 | 5/1959 | Perry ........................... | 166/307 |
| 3,131,759 | 5/1964 | Slusser et al. ................ | 166/305 |
| 3,441,085 | 4/1969 | Gidley ......................... | 166/307 |
| 3,481,404 | 12/1969 | Gidley ......................... | 166/307 |

*Primary Examiner*—Stephen J. Novosad
*Attorneys*—James A. Reilly, John B. Davidson, Lewis H. Eatherton, James E. Gilchrist, Robert L. Graham and James E. Reed

ABSTRACT: A method for improving the permeability of a sandstone or other siliceous formation surrounding a wellbore wherein an aqueous acid solution capable of attacking mineral constituents in the formation and a low molecular weight aliphatic glycol ether are injected into the formation in quantities sufficient to penetrate a substantial distance from the wellbore. The glycol ether may be incorporated in the acid solution, introduced behind the acid and followed by an aqueous afterflush, or added to an aqueous afterflush following the acid solution. If the well is an injection well, injection operations can be resumed following introduction of the treating agents. If it is a production well, the injected fluids may be produced back into the wellbore after the treating agents have been introduced.

3,548,945

METHOD FOR ACIDIZING SILICEOUS FORMATIONS

CROSS-REFERENCE TO RELATED APPLICATIONS

This application is a continuation-in-part of application Ser. No. 796,168, filed in the U.S. Pat. Office on Feb. 3, 1969, and now U.S. Pat. No. 3,481,404.

BACKGROUND OF THE INVENTION

1. Field of the Invention

This invention relates to the acid treatment of sandstones and similar subterranean formations surrounding oil wells, gas wells, and similar boreholes.

2. Description of the Prior Art

Acid solutions are often used to stimulate the production of fluids from sandstones and other siliceous formations surrounding oil and gas wells. The methods employed, generally referred to as sandstone acidizing processes, normally involve the injection of an aqueous solution containing a mixture of hydrofluoric and hydrochloric acids into the formation and the subsequent production of spent acid from the formation into the wellbore. Although such methods are generally effective, experience has shown that many sandstones, serpentines, and similar siliceous formations do not respond to the acid treatment. Despite the injection of large quantities of acid, little or no improvement in permeability is obtained. This has restricted the application of sandstone acidizing and promoted the use of fracturing and other more expensive stimulation techniques.

SUMMARY OF THE INVENTION

This invention provides an improved method for acidizing sandstones, serpentines, and other siliceous formations to overcome formation damage and improve permeability. In accordance with the invention, it has now been found that many of the difficulties normally encountered in the past can be avoided by first injecting an aqueous acid solution capable of attacking the siliceous formation and a low molecular weight aliphatic glycol ether into the formation and thereafter resuming injection or production operations. The glycol ether may be incorporated in the acid solution, introduced behind the acid and followed by an aqueous afterflush solution, or added to the afterflush solution. Laboratory and field tests have shown that this method has much broader application than methods employed in the past, that it is relatively inexpensive and presents few operational problems, and that it often permits the successful stimulation of sandstones and other formations that do not respond to conventional sandstone acidizing treatments.

The reasons for the improved results obtained in accordance with the invention are not fully understood. Studies indicate, however, that many of the difficulties encountered in sandstone acidizing operations are due to the loosening of formation fines and the formation of insoluble reaction products as the acid reacts with clay minerals, siliceous and quartzitic materials and carbonaceous cementing agents present in the formation. These products accumulate at the oil-water interfaces and promote the formation of stable emulsions which retard movement in the pore spaces. The low molecular weight glycol ethers used in accordance with the invention render the solid reaction products and fines water-wet and thus eliminate or retard the formation of such emulsions. They also tend to promote water-wetting of the formation surfaces so that the relative permeability to oil is improved. Immiscible displacement of water as the fluids are produced back into the wellbore and the saturation of oil in the system with water due to the presence of the ethers reduce the water saturation in the region near the wellbore and thus further improve the relative permeability to oil. These effects result in more effective stimulation than can be obtained with the acid alone. Other phenomena may also be involved.

DESCRIPTION OF THE PREFERRED EMBODIMENTS

The composition of the aqueous acid solution employed in carrying out the invention will depend in part upon the particular type of formation to be treated. Although hydrofluoric acid is normally used for the acidizing of sandstones, serpentines, and similar materials, experience has shown that certain siliceous formations also respond to treatment with hydrochloric and organic acids, apparently because of the presence of carbonates in combination with the siliceous materials. The method of the invention may therefore be carried out with hydrofluoric acid solutions; hydrochloric acid solutions; solutions of formic, acetic, propionic, and similar low molecular weight organic acids; and mixed acid solutions. The hydrofluoric acid will normally be used in concentrations between about 1 percent and about 30 percent by weight. Solutions of hydrochloric acid employed will ordinarily have concentrations between about 5 percent and about 35 percent by weight. The organic acids will generally be used in concentrations ranging from about 10 percent to 99 percent or more by weight.

Mixtures of hydrofluoric acid with hydrochloric acid or a low molecular weight organic acid such as formic acid, acetic acid, or propionic acid are generally preferred for purposes of the invention. They hydrofluoric acid-hydrochloric acid mixtures are often referred to as mud acids because of their ability to dissolve drilling mud particles. These acids normally have hydrogen fluoride contents between about 2 percent and about 6 percent by weight and hydrogen chloride contents between about 9 percent and about 13 percent by weight. They may be prepared by adding crystalline ammonium bifluoride to an hydrochloric acid solution. The hydrogen chloride reacts with the bifluoride salt to form hydrogen fluoride and hence the more salt added the greater will be the hydrogen fluoride concentration and the lower will be the hydrogen chloride concentration. Other preparation methods, including the mixing of hydrofluoric acid with hydrochloric acid or an organic acid such as formic acid, acetic acid, or propionic acid can also be employed.

The acid solutions described above will normally contain corrosion inhibitors designed to protect the tubular goods and other equipment against acid attack. Suitable inhibitors include inorganic arsenic compounds, acetylenic alcohols, thiophenols, heterocyclic nitrogen compounds, substituted thioureas, rosin amine derivatives, quarternary ammonium compounds, and similar organic agents. Other additives may also be present. These include surfactants designed to function as demulsifiers, wetting agents, antisludge agents, and retarding agents; complexing agents intended to prevent the formation of gelatinous iron hydroxides; gelling agents for reducing the pressure drop through the tubing, retarding the acid reaction rate, and reducing fluid losses during acid fracturing operations; diverting agents intended for temporarily plugging the more permeable zones and thus promoting more uniform acid attack; and similar materials. A wide variety of additives designed to perform these and related functions are available commercially and will be familiar to those skilled in the art. The additives selected should, of course, be compatible with the particular acid solution and glycol ether to be employed.

The glycol ethers utilized for purposes of the invention are low molecular weight aliphatic glycol ethers containing from about three to about 12 carbon atoms per molecule which are at least partially soluble in both oil and water under the conditions existing within the formation to be treated. Examples of such ethers include ethylene glycol monomethyl ether, ethylene glycol dimethyl ether, diethylene glycol dimethyl ether, ethylene glycol monoethyl ether, ethylene glycol diethyl ether, diethylene glycol diethyl ether, ethylene glycol monopropyl ether, ethylene glycol monobutyl either, diethylene glycol n-butyl ether, propylene glycol monomethyl ether, propylene glycol dimethyl ether, propylene glycol monoethyl ether, dipropylene glycol dimethyl ether, tripropylene glycol monomethyl ether, and the like. Ethylene glycol monobutyl ether has been found particularly effective for purposes of the invention and is therefore preferred.

The quantities in which they glycol ethers are used will depend in part on the manner in which the invention is carried out. Laboratory work and field tests have shown that the ether may be incorporated in the acid solution used; injected into the formation behind the acid solution and followed by an aqueous afterflush of water, brine, hydrochloric acid or organic acid; or added to such an afterflush. It is normally preferred to add the glycol ether to either the acid or aqueous afterflush solution. When used in this manner, the ether will normally be incorporated in the acid or afterflush solution in a concentration between about 2 percent and about 25 by volume. The amount of afterflush used will generally range from about one-fourth to about 10 volumes per volume of acid solution. The use of from about 10 to about 500 gallons of acid solution containing from about 5 percent to about 15 percent by volume of the glycol ether per foot of formation thickness is generally effective. If the glycol ether is injected behind the acid and followed by the water, acid solution, or other aqueous afterflush, from about 1 to about 100 gallons of ether and from about 10 to about 500 gallons of the afterflush per foot of formation thickness will normally be employed. Corrosion inhibitors, surface active agents, and other additives may be present in the afterflush solution if desired.

The procedures used to prepare the well in which the method of the invention is to be used will depend in part upon the type of well to be treated. In a pumping oil well, for example, it is normally preferred to unseat the packer and inject brine to displace fluid standing in the wellbore. The sucker rods, pump, and associated equipment can then be removed from the well. Accumulated wax and other foreign material present in the perforation or adhering to the face of the producing formation can be removed by running a scratcher or similar device within the producing interval. A string of tubing provided with a packer is then lowered into the wellbore to a point above the zone to be treated and the well is filled with diesel oil. In a flowing oil well or water injection well, on the other hand, the treating fluids can be pumped directly into the formation through the tubing without unseating the packer. Similarly, gas injection and production wells generally require little or no preparation. Since the tubing in such wells is normally filled with gas and no pumping equipment is present, the well can be killed by simply injecting diesel oil or brine through the tubing string. The preparation steps employed in carrying out the invention may thus be similar to those used in conventional acid treating operations and will therefore be familiar to those skilled in the art.

Following preparation of the well, the invention may be carried out by injecting an acid solution containing the glycol ether into the producing formation surrounding the wellbore. It is normally preferred that the injection pressure be kept below that necessary to fracture the formation so that penetration of the acid into the formation matrix occurs. The injection rate selected should generally be sufficient to keep the pressure just below that necessary to fracture the formation. To achieve maximum penetration of the acid, the rate should normally be increased as the matrix permeability increases due to acid attack. If the interval being treated is more than about 5 feet in thickness or if more than five perforations are open to the wellbore, it may be advisable to include an oil soluble, acid insoluble powdered diverting agent in the acid solution to promote balanced acid invasion of the entire zone. Commercially available cyclopentadiene resins and similar oil soluble, water insoluble polymers are suitable for this purpose. Such material may be employed in concentrations ranging from about 0.5 pounds per perforation up to about 5 pounds per perforation, depending upon the permeability of the particular formation.

If the glycol ether is not incorporated in the acid solution, the ether and an aqueous afterlush or an aqueous afterflush containing the ether will normally be introduced into the formation behind the acid. Again the injection rate should be maintained at a level just below that at which fracturing of the formation is apt to occur. Injection of the afterflush is continued until the desired quantities of glycol ether and aqueous afterflush solution have been introduced. As the afterflush displaces the acid into the formation, it tends to improve the relative permeability to oil and render the formation surfaces and precipitated solids water-wet. The well may be returned to injection or production operations as soon after the acid solution containing the glycol ether or the afterflush has been injected as practicable. No specific waiting period is required. There are indications that leaving the spent acid in the formation for long periods may have detrimental effects on production wells but many wells have been shut in overnight following injection of the acid or acid and afterflush without detrimental results.

In lieu of injecting all of the acid and then following this with all of the ether and afterflush in the manner referred to above, the acid and the ether or afterflush can each be injected in two or more stages as desired. By injecting ether or afterflush behind the acid in each stage, more uniform treatment of the formation and better overall results can sometimes be obtained. The procedure described above may also be modified by use of a preflush of hydrochloric acid, formic acid, acetic acid, or a similar material capable of reacting with carbonates present in the formation. The use of such a preflush is advantageous because it promotes the removal of carbonates prior to introduction of the mud acid and thus permits more effective utilization of the hydrogen fluoride in the mud acid. It also displaces connate water and thereby alleviates difficulties due to the precipitation of sodium fluosilicate, an insoluble gelatinous material which has been shown to have a detrimental effect upon formation permeability. It is also advantageous in many cases to include a small amount of a surface active agent having water-wetting properties in the afterflush solution. About 0.1 percent of a nonionic surfactant such as a polyethylene glycol ether of a dialkyl ester of an unsaturated $C_4$ to $C_5$ dibasic acid has been found to be particularly effective for this purpose, although other surfactants may be used.

The nature and objects of the invention are further illustrated by the results of a field test carried out in a gas well producing from a sandstone formation 110 feet thick at a depth of 14,404 feet. This formation had a permeability of 23.9 millidarcies, a porosity of 19.8 percent, and a connate water saturation of 12.8 percent. The well had initially been acidized with a mixture of hydrochloric and hydrofluoric acids followed by an afterflush of diesel oil containing a glycol ether miscible with both oil and water. Following this initial treatment, the well produced 5.32 million cubic feet of gas per day and 113 barrels of oil per day. The diesel oil afterflush had apparently reduced the permeability of the formation to gas. To increase the production, the well was treated with 200 gallons of 15 percent hydrochloric acid and 220 gallons of a mixture of 12 percent hydrochloric acid and 3 percent hydrofluoric acid containing about 10 percent by volume of ethylene glycol monobutyl ether. The hydrochloric acid preflush and the mud acid containing the glycol ether were injected into the formation at a rate of about one barrel per minute. Immediately following injection of the mud acid, the well was swabbed to initiate the backflow of fluids from the formation into the wellbore. Following the treatment in accordance with the invention, the well produced gas at the rate of 6.15 million cubic feet per day and oil at the rate of 162 barrels per day.

In a second field test, a gas injection well being used for pressure maintenance purposes was treated to permit an increase in the gas injection rate. This well had been completed in the upper part of a sandstone reservoir containing an oil of moderate viscosity and perforated over an interval extending from 10,876 to 10,894 feet. Before the treatment, gas was being injected into the well at a rate of 750,000 cubic feet per day. The injection pressure was 4,000 pounds per square inch. Tubing pressure at several of the producing wells located downstructure were declining, indicating the need for higher gas injection rates. Gas lift systems had had to be installed in two of the producing wells.

The treatment carried out involved the initial introduction of 250 gallons of a preflush of 15 percent hydrochloric acid into the formation; the injection of 500 gallons of a mud acid solution containing 3 percent hydrofluoric acid, 12 percent hydrochloric acid, and about 10 percent by volume of ethylene glycol monobutyl ether behind the preflush; and the subsequent displacement of the acid solution with 250 gallons of an afterflush of 15 percent hydrochloric acid solution containing about 10 percent by volume of ethylene glycol monobutyl ether. The treatment was carried out at matrix rates and gas injection was recommenced following the afterflush. It was found that the injectivity had increased to 1.6 million cubic feet per day at a surface pressure of only 2,800 pounds per square inch.

The results obtained in the field tests described above demonstrate the surprising effectiveness of the method of the invention. In the first test, an increase in production of nearly a million cubic feet of gas and about 50 barrels of oil per day was obtained. In the second case, the injectivity of the well was more than doubled with a reduction in the injection pressure of over 1,000 pounds per square inch. Both of these tests were carried out in fields that are difficult to stimulate and hence it is apparent that the method of the invention is highly effective.

In a further series of tests, two water injection wells were treated in accordance with the invention to improve injectivity. These wells were completed in sandstone formations in which waterflooding operations were being carried out. One well was 13,150 feet deep and was completed over an interval of 148 feet. The water injection rate before treatment was 200 barrels per day at a pressure of 5,000 pounds per square inch. The other well, 10,920 feet deep and completed over an interval of 94 feet, was accepting water at a rate of 50 barrels per day under a pressure of 5,000 pounds per square inch. These two wells were treated by first injecting a solution of 15 percent hydrochloric acid as a preflush, following this with a 3 percent solution of hydrofluoric acid containing about 10 percent by volume of ethylene glycol monobutyl ether and about 0.1 percent by volume of surfactant comprising a polyethylene glycol ether of a dioctyl ester of succinic acid, and then injecting a 15 percent hydrochloric acid solution as an afterflush. The treatment volumes used and the results obtained are shown in the following table.

TREATMENT OF WATER INJECTION WELLS

| Well: | Depth, ft. | Interval, ft. | Treatment | Injectivity Before | Injectivity After |
|---|---|---|---|---|---|
| A | 13,150 | 148 | A. 2,000 gal. 15% HCl<br>B. 3,500 gal. 3% HF<br>Plus 10% glycol ether<br>Plus 0.1% surfactant<br>C. 2,000 gal. 15% HCl | 200 BWPD at 5,000 p.s.i. | 3,500 BWPD at 3,800 p.s.i. |
| B | 10,920 | 94 | A. 500 gal. 15% HCl<br>B. 3,500 gal. 3% HF<br>Plus 10% glycol ether<br>Plus 0.1% surfactant<br>C. 2,000 gal. 15% HCl | 50 BWPD at 5,000 p.s.i. | 1,400 BWPD at 3,800 p.s.i. |

It will be noted from the table that the treatments produced substantial improvements in injectivity. In one case, the volume of water injected per day following the treatment was 17.5 times that injected before treatment, despite a much lower injection pressure. In the other case, the volume after treatment was 28 times that before the treatment, again at lower pressure. These results further demonstrate the surprising effectiveness of the method of the invention.

I claim:

1. A method for improving the permeability of a siliceous formation surrounding a wellbore which comprises treating said formation with an aqueous solution of an acid capable of attacking mineral constituents of said formation and with a low molecular weight aliphatic glycol ether containing from about three to about 12 carbon atoms per molecule, said acid and said glycol ether constituting the sole essential treating agents and said acid solution and said glycol ether being employed in quantities sufficient to penetrate a substantial distance into said formation from said wellbore.

2. A method as defined by claim 1 wherein said glycol ether is injected into said formation as a constituent of said acid solution.

3. A method as defined by claim 1 wherein said glycol ether is injected into said formation in an aqueous solution behind said aqueous acid solution.

4. A method as defined by claim 1 wherein said glycol ether is injected into said formation behind said acid solution and is followed by an aqueous afterflush.

5. A method as defined by claim 1 wherein said acid comprises hydrofluoric acid.

6. A method as defined by claim 1 wherein said glycol ether is ethylene glycol monobutyl ether.

7. A method for stimulating a siliceous subterranean formation surrounding a wellbore which comprises injecting an aqueous solution consisting essentially of an acid capable of attacking mineral constituents of said formation, a low molecular weight aliphatic glycol ether containing from about three to about 12 carbon atoms per molecule, and water into said formation in a quantity sufficient to penetrate a substantial distance from the wellbore.

8. A method as defined by claim 7 wherein said glycol ether is present in said aqueous solution in a concentration between about 2 percent and about 25 percent by volume.

9. A method as defined by claim 7 wherein said acid comprises hydrofluoric acid.

10. A method as defined by claim 7 wherein said glycol ether is ethylene glycol monobutyl ether.

11. A method as defined by claim 7 wherein said acid is a mixture of hydrofluoric acid and hydrochloric acid.

12. A method as defined by claim 7 wherein said acid is a mixture of hydrofluoric acid and a low molecular weight organic acid.

13. A method as defined by claim 7 wherein from about 10 to about 500 gallons of said solution is injected per foot of formation thickness.

14. A method for stimulating a siliceous subterranean formation surrounding a wellbore which comprises injecting an aqueous solution of an acid capable of attacking mineral constituents of said formation into said formation and thereafter injecting an aqueous afterflush consisting essentially of water and a low molecular weight aliphatic glycol ether containing from about three to about 12 carbon atoms per molecule into said formation behind said aqueous solution of said acid.

15. A method as defined by claim 14 wherein said acid comprises hydrofluoric acid and said glycol ether comprises ethylene glycol monobutyl ether.

16. A method as defined by claim 14 wherein said glycol ether is present in said aqueous afterflush in a concentration between about 5 percent and about 15 percent by volume.

17. A method as defined by claim 14 wherein from about one-fourth to about 10 volumes of said afterflush is injected for each volume of said solution of said acid.

18. A method as defined by claim 14 wherein said afterflush includes a nonionic surface active agent.

19. A method for stimulating a siliceous subterranean formation surrounding a wellbore which comprises injecting an aqueous solution of an acid capable of attacking mineral constituents of said formation into the formation, injecting a low molecular weight aliphatic glycol ether containing from about three to about 12 carbon atoms per molecule into said formation behind said solution of said acid, and thereafter injecting an aqueous afterflush into said formation behind said glycol ether.

20. A method as defined by claim 19 wherein said acid comprises hydrofluoric acid and said glycol ether is ethylene glycol monobutyl ether.

21. A method for improving the permeability of a siliceous subterranean formation surrounding a wellbore which comprises injecting an aqueous solution of hydrochloric acid into said formation, injecting an aqueous solution of hydrofluoric acid containing from about 5 percent to about 15 percent by volume of ethylene glycol monobutyl ether into said formation behind said solution of hydrochloric acid, and thereafter injecting an aqueous solution of hydrochloric acid into said formation behind said solution of hydrofluoric acid.